Sept. 24, 1957 E. L. WHITE Re. 24,360

ORNAMENTATION

Original Filed Dec. 24, 1943 2 Sheets-Sheet 1

Inventor
Ezra L. White,

By J. Stanley Burch
Attorney

ORNAMENTATION

Original Filed Dec. 24, 1943 2 Sheets-Sheet 2

Inventor
Ezra L. White,

By J. Stanley Burch
Attorney

United States Patent Office

Re. 24,360
Reissued Sept. 24, 1957

24,360

ORNAMENTATION

Ezra Louis White, Barre, Vt., assignor to Rock of Ages Corporation, Barre, Vt., a corporation of Vermont Original No. 2,349,065, dated May 16, 1944, Serial No. 515,557, December 24, 1943. Application for reissue August 21, 1956, Serial No. 605,692

9 Claims. (Cl. 41—34)

Matter enclosed in heavy brackets [ ] appears in the original patent but forms no part of this reissue specification; matter printed in italics indicates the additions made by reissue.

This invention relates to the art of ornamentation, and has more particular reference to an improved method of providing a granite or other stone memorial monument or grave marker with a rosary design, and the product of such method.

The primary object of the invention is to provide a stone monument with a rosary design that will be pleasing and realistic in appearance, as well as durable and long-lasting.

The invention consists in the novel method and product thereof hereinafter more fully described, shown in the accompanying drawings, and claimed.

Figures 1, 6, 7:
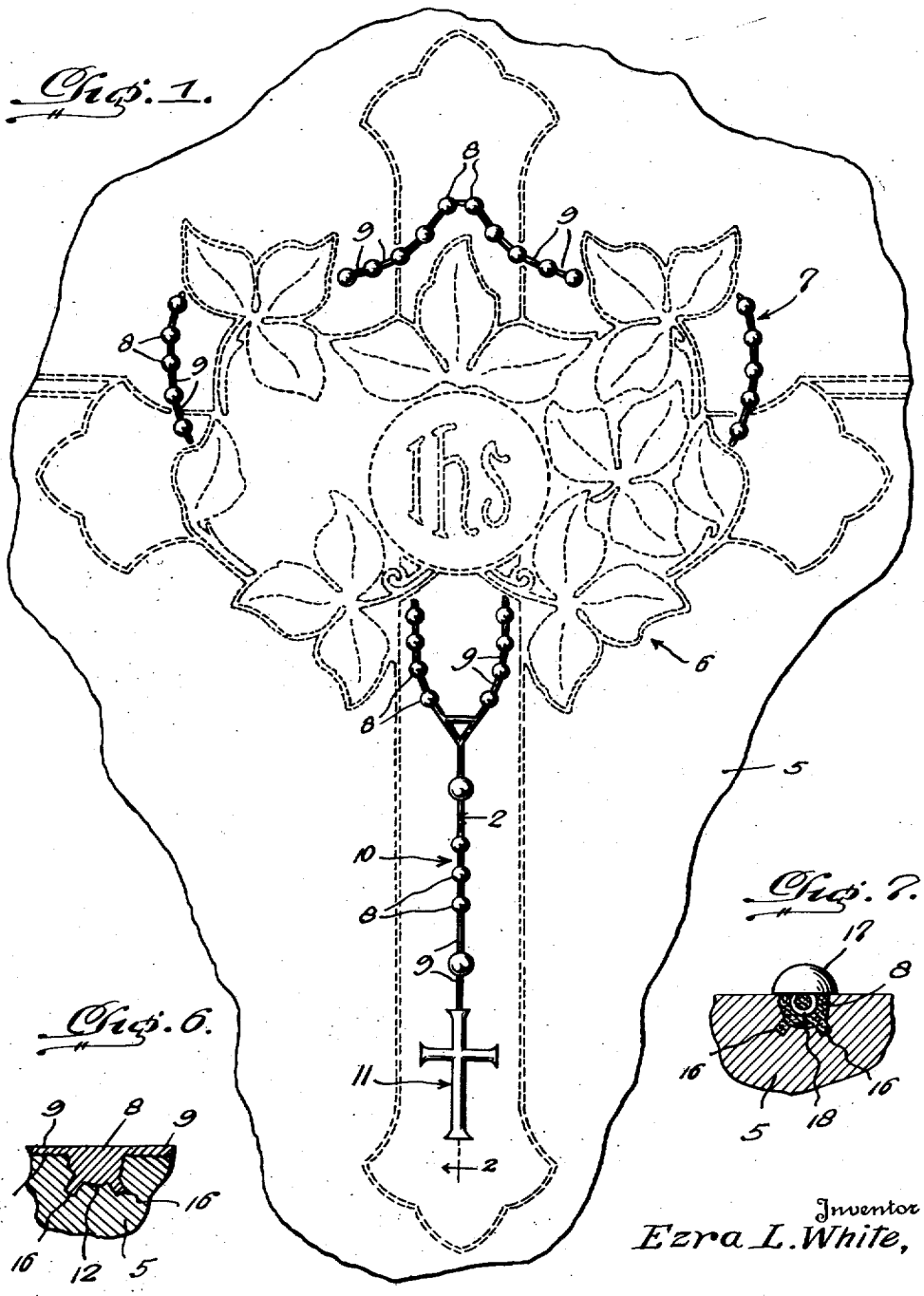
Figure 1 is a fragmentary elevational view of a monument provided with a rosary design in accordance with the present invention.
Figures 5 to 8 inclusive are further sectional detail views, respectively showing further modifications.

In Figure 1, I have shown a stone monument 5 having a large leaf or flower and cross design 6 cut or otherwise suitably provided thereon, and further having a small rosary design provided thereon in accordance with the present invention, the rosary design having the appearance of being draped over the cross of the larger leaf or flower and cross design.

As is well known, a rosary consists of a necklace 7 composed of alternating spherical and tubular beads 8 and 9 strung on a chain or cord, and a pendant 10 depending from the necklace and including a string of the alternating spherical and tubular beads terminating with a cross 11.

In accordance with the present invention, the rosary design is cut or sandblown in the surface of the stone so as to provide the design of the necklace and of the string of the pendant in said surface in the form of hemispherical pockets 12 alternating with and connected by shallower narrow elongated channels or grooves 13. The design of the cross 11 of the pendant is similarly provided by cutting or sandblasting crossed channels 14 in the surface of the stone.

Figure 2:
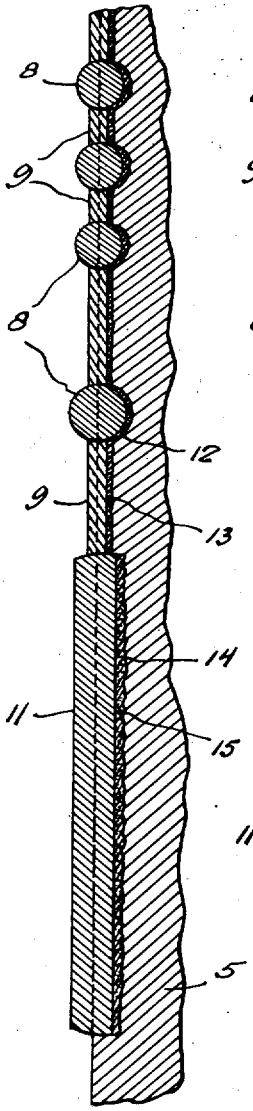
Figure 2 is an enlarged fragmentary section taken on the line 2—2 of Figure 1.

I then fill the pockets and channels so as to give the bead and cross design a pleasing and realistic appearance. As shown in Figures 1 and 2, separate bead and cross members made of glass, metal or other suitable material may be set in the pockets and channels and anchored in place by cement 15 or like material. If the bead members are of spherical and cylindrical form, respectively, they will project from the pockets and channels and have a most realistic appearance, as shown in Figure 2. The same effect may apply to the cross 11, as also shown in this figure.

Figure 3:
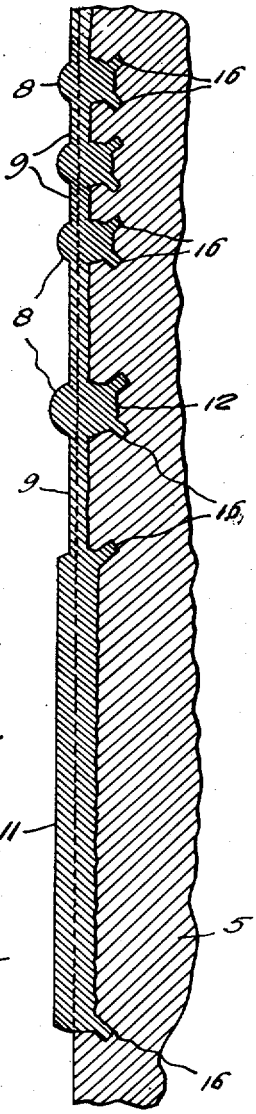
Figure 3 is a view similar to Figure 2, showing a modification of the invention.
Figure 4:
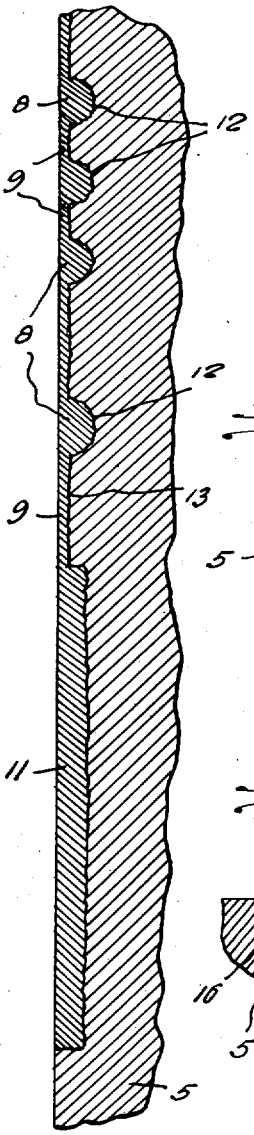
Figure 4 is another view similar to Figure 2, showing a further modification.
Figure 5:
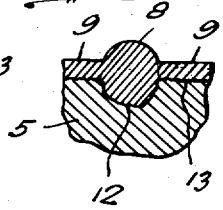

However, as shown in Figures 3 to 6 inclusive, the beads and cross may be formed integral by filling the pockets and channels with softened plastic or molten material which hardens upon exposure to air or cooling. This material may be anchored in place by flowing into inclined anchoring sockets 16 provided in the bottoms of the pockets and channels as shown in Figures 3 and 6, and the material may be raised above the surface of the stone as shown in Figures 3 and 5, or smoothed off flush with such surface as shown in Figures 4 and 6. In Figures 4 and 5, the sockets 16 are omitted, and the surfaces of the pockets and channels are left rough so that the material will anchor therein.

Figure 8:
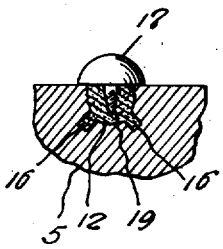

As shown in Figures 7 and 8, raised spherical beads may be simulated by anchoring separate semi-spherical bead members 17 to the bead portions 8, of the poured plastic of molten material, in the forms of Figures 4 and 6, wherein the material is flush with surface of the stone. These members 17 may have eyes 18 (Figure 7) or screws 19 (Figure 8), embedded in the material as anchoring elements.

From the foregoing description, the invention and its advantages will be readily understood and appreciated. It will be evident that the invention effectively carries out the stated objects thereof.

What I claim is:

[1. The herein-described method of providing a stone memorial monument with a rosary design, which method consists in cutting the design in the surface of the stone so as to provide hemispherical pockets alternating with and connected by shallower narrow semi-cylindrical channels to form the necklace and pendant string of the design, and crossed channels to form the cross of the pendant, and filling said pockets and channels.]

[2. The herein-described method of providing a stone memorial monument with a rosary design, which method consists in cutting the design in the surface of the stone so as to provide hemispherical pockets alternating with and connected by shallower narrow semi-cylindrical channels to form the necklace and pendant string of the design, and crossed channels to form the cross of the pendant, and filling said pockets and channels respectively with separate spherical and cylindrical bead members and a cross member, and anchoring said members in place.]

[3. The herein-described method of providing a stone memorial monument with a rosary design, which method consists in cutting the design in the surface of the stone so as to provide hemispherical pockets alternating with and connected by shallower narrow semi-cylindrical channels to form the necklace and pendant string of the design, and crossed channels to form the cross of the pendant, and filling said pockets and channels by pouring suitable self-hardening material therein to form integral bead members and an integral cross member.]

[4. The herein-described method of providing a stone memorial monument with a rosary design, which method consists in cutting the design in the surface of the stone so as to provide hemispherical pockets alternating with and connected by shallower narrow semi-cylindrical channels to form the necklace and pendant string of the design, and crossed channels to form the cross of the pendant, forming inclined sockets in the bottoms of the pockets and channels, and filling the pockets and channels with material which flows into the sockets for anchoring it in place.]

[5. A stone memorial monument having a rosary design cut in the surface thereof so as to provide hemi-spherical pockets alternating with and connected by shallower narrow semi-cylindrical channels to form the necklace and pendant string of the design, and crossed channels to form the cross of the pendant, in combination with a filling in said pockets and channels.]

[6. A stone memorial monument having a rosary design cut in the surface thereof so as to provide hemispherical pockets alternating with and connected by shallower narrow semi-cylindrical channels to form the necklace and pendant string of the design, and crossed channels to form the cross of the pendant, in combination with a filling in said pockets and channels, said filling comprising separate spherical and cylindrical bead members and a cross member, and means anchoring said members in place.]

[7. A stone memorial monument having a rosary design cut in the surface thereof so as to provide hemispherical pockets alternating with and connected by shallower narrow semi-cylindrical channels to form the necklace and pendant string of the design, and crossed channels to form the cross of the pendant, in combination with a filling in said pockets and channels composed of self-hardening material flush with the surface of the monument, and separate hemi-spherical bead members disposed upon and anchored to the material in said pockets.]

*8. The herein described method of providing a stone memorial monument with a rosary design, which method consists in cutting the design in the surface of the stone so as to provide hemi-spherical pockets alternating with and connected by shallower narrow semi-cylindrical channels to form the necklace and pendant string of the design, and crossed channels to form the cross of the pendant, pouring a self hardening material into said pockets and channels, and anchoring hemi-spherical bead members to said stone by embedding protrusions on said bead members in said self hardening material in said pockets.*

*9. The herein described method of providing a stone memorial monument with a rosary design, which method consists in cutting the design in the surface of the stone so as to provide hemi-spherical pockets alternating with and connected by shallower narrow semi-cylindrical channels to form the necklace and pendant string of the design, and crossed channels to form the cross of the pendant, pouring a self hardening material into said pockets and channels, and anchoring hemi-spherical bead members to said stone by embedding eyes on said bead members in said self hardening material in said pockets.*

*10. The herein-described method of providing a stone memorial monument with a rosary design, which method consists in cutting the design in the surface of the stone so as to provide hemi-spherical pockets alternating with and connected by shallower narrow semi-cylindrical channels to form the necklace and pendant string of the design, and crossed channels to form the cross of the pendant, pouring a self hardening material into said pockets and channels, and anchoring hemi-spherical bead members to said stone by embedding screws on said bead members in said self hardening material in said pockets.*

*11. A stone memorial monument having a rosary design cut in the surface thereof so as to provide hemispherical pockets alternating with and connected by shallower narrow semi-cylindrical channels to form the necklace and pendant string of the design, and crossed channels to form the cross of the pendant, in combination with a self hardening material in said pockets and channels, and spherate hemi-spherical beads having protrusions thereon embedded in said self hardening material in said pockets.*

*12. A stone memorial monument having a rosary design cut in the surface thereof so as to provide hemispherical pockets alternating with and connected by shallower narrow semi-cylindrical channels to form the necklace and pendant string of the design, and crossed channels to form the cross of the pendant, in combination with a self hardening material in said pockets and channels, and separate hemi-spherical beads having eyes thereon embedded in said self hardening material in said pockets.*

*13. A stone memorial monument having a rosary design cut in the surface thereof so as to provide hemispherical pockets alternating with and connected by shallower narrow semi-cylindrical channels to form the necklace and pendant string of the design, and crossed channels to form the cross of the pendant, in combination with a self hardening material in said pockets and channels, and separate hemi-spherical beads having screws thereon embedded in said self hardening material in said pockets.*

*14. A stone memorial monument having a rosary design cut in the surface thereof so as to provide hemispherical pockets alternating with and connected by shallower narrow semi-cylindrical channels to form the necklace and pendant string of the design, and crossed channels to form the cross of the pendant, in combination with a self hardening material in said pockets and channels flush with the surface of said stone, and separate hemispherical beads having protrusions thereon embedded in said self hardening material in said pockets.*

*15. A stone memorial monument having a rosary design cut in the surface thereof so as to provide hemispherical pockets alternating with and connected by shallower narrow semi-cylindrical channels to form the necklace and pendant string of the design, and crossed channels to form the cross of the pendant, in combination with a self hardening material in said pockets and channels flush with the surface of said stone, and separate hemispherical beads having eyes thereon embedded in said self hardening material in said pockets.*

*16. A stone memorial monument having a rosary design cut in the surface thereof so as to provide hemispherical pockets alternating with and connected by shallower narrow semi-cylindrical channels to form the necklace and pendant string of the design, and crossed channels to form the cross of the pendant, in combination with a self hardening material in said pockets and channels flush with the surface of said stone, and separate hemispherical beads having screws thereon embedded in said self hardening material in said pockets.*

References Cited in the file of this patent or the original patent

| | | |
|---|---|---|
| 667,898 | Wilcke | Feb. 12, 1901 |
| 678,383 | Eppler | July 16, 1901 |
| 949,155 | Mrazek | Feb. 15, 1910 |
| 1,632,969 | Page | Mar. 29, 1927 |
| 2,349,065 | White | May 16, 1944 |

FOREIGN PATENTS

| | | |
|---|---|---|
| 343,124 | France | July 27, 1904 |